(12) United States Patent
Bleile et al.

(10) Patent No.: US 6,295,348 B1
(45) Date of Patent: Sep. 25, 2001

(54) METHOD OF ARBITRATING TYPE II/TYPE III CPE'S DURING SCWID

(75) Inventors: Leonard George Bleile; Christopher Henry Becker, both of Calgary (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/970,207

(22) Filed: Nov. 14, 1997

Related U.S. Application Data (63) Continuation-in-part of application No. 08/832,838, filed on Apr. 4, 1997.

(51) Int. Cl.⁷ .................................................. H04M 1/66
(52) U.S. Cl. ........................ 379/199; 379/171; 379/177; 379/215
(58) Field of Search .................. 379/67.1, 142, 379/156, 196, 197, 198, 199, 229, 230, 377, 381, 382, 164, 215, 373, 399, 171, 177

(56) References Cited

U.S. PATENT DOCUMENTS

| | | | |
|---|---|---|---|
| 3,660,610 | 5/1972 | Hestad et al. .................. 179/18 BC |
| 3,758,729 | 9/1973 | Everhart .................. 179/99 |
| 3,927,264 * | 12/1975 | Fish et al. .................. 379/102.01 |
| 4,827,461 * | 5/1989 | Sander .................. 379/68 |
| 4,953,200 * | 8/1990 | Yamasaki .................. 379/156 |
| 5,111,502 * | 5/1992 | McClure et al. .................. 379/380 |
| 5,263,084 | 11/1993 | Chaput et al. .................. 379/215 |
| 5,283,825 | 2/1994 | Druckman et al. .................. 379/167 |
| 5,392,341 * | 2/1995 | Wilkinson et al. .................. 379/214 |
| 5,502,761 | 3/1996 | Duncan et al. .................. 379/142 |
| 5,519,774 * | 5/1996 | Battista et al. .................. 379/386 |
| 5,583,924 | 12/1996 | Lewis .................. 379/142 |
| 5,745,557 * | 4/1998 | Anglikowski .................. 379/177 |
| 5,768,367 * | 6/1998 | Westergaard et al. .................. 379/413 |
| 5,812,649 * | 9/1998 | Shen .................. 379/142 |
| 5,937,058 * | 8/1999 | Bleile et al. .................. 379/377 |
| 6,122,353 * | 9/2000 | Brady et al. .................. 379/142 |

\* cited by examiner

*Primary Examiner*—Ahmad F. Matar
*Assistant Examiner*—Bing Bui
(74) *Attorney, Agent, or Firm*—Cobrin & Gittes (57) ABSTRACT

A method and apparatus for signalling a telephone switch to indicate the presence of a telephone of a pre-defined type on a subscriber loop. A subscriber loop is sensed to detect whether or not a telephone of a pre-defined type is connected to the subscriber loop. A first acknowledgement signal is transmitted to the telephone switch if the telephone of the pre-defined type is connected to the subscriber loop and off-hook and a second acknowledgement signal is transmitted to the telephone switch if the telephone of the pre-defined type is not off-hook.

43 Claims, 9 Drawing Sheets

METHOD OF ARBITRATING TYPE II/TYPE III CPE'S DURING SCWID

CROSS-REFERENCES TO RELATED APPLICATIONS

This is a continuation-in-part of U.S. application Ser. No. 08/832,838 filed Apr. 4, 1997.

FIELD OF THE INVENTION

This invention relates to telephone equipment at a subscriber end of a subscriber loop, responsive to caller alert signals by transmitting an acknowledgement signal indicative of whether or not a telephone of a particular type is off hook at the subscriber's premises.

BACKGROUND OF THE INVENTION

At subscriber's premises where more than one telephone may be offhook, such telephones may be of different types. Such different types of telephones may be capable of responding to SCWID information and others may not. Furthermore, some telephones may be capable of sending acknowledgement signals back to a telephone switch whereas others may not. In addition, some telephones are capable of extended service such as ADSI service and an indication must be provided to the switch as to whether or not an ADSI compliant telephone is connected to the subscriber line.

Telephone companies and the telephone industry have expressed a desire to always allow the highest level of service. This means that it is not acceptable to reduce to the lowest common denominator and not allow ADSI events to occur if multiple sets are offhook at the subscriber premises. In essence, it is desirable never to block ADSI events as this is a high value user pay service.

It would be desirable to send different acknowledgment signals, to indicate the presence or absence of offhook telephones of particular types on the subscriber loop.

SUMMARY OF THE INVENTION

In accordance with one aspect of the invention, there is provided an method of signalling a telephone switch to indicate the presence of a telephone of a pre-defined type on a subscriber loop. The method includes the steps of:
a) sensing the subscriber loop to detect whether or not a telephone of a pre-defined type is connected to the subscriber loop; and
b) transmitting to the telephone switch a first acknowledgement signal if the telephone of the pre-defined type is connected to the subscriber loop and off-hook and transmitting to the telephone switch a second acknowledgement signal if the telephone of the pre-defined type is not off-hook.

Preferably, the method includes the step of detecting low frequency modulation on the subscriber loop, to detect whether or not the telephone of the pre-defined type is off-hook.

Preferably, the method includes the step of monitoring dc voltage or dc current on the subscriber loop to detect signal transitions indicative of an extension-in-use.

Preferably, the method includes the step of determining whether or not a signal transition indicative of an extension-in-use occurs within a pre-defined window of time.

Preferably, the method includes the step of determining whether or not a signal transition indicative of an extension-in-use occurs within first or second pre-defined windows of time.

Preferably, the method includes the step of transmitting the first acknowledgement signal if the signal transition indicative of an extension-in-use occurs within the first window of time and transmitting the second acknowledgement signal if the signal transition indicative of an extension-in-use occurs within the second window of time.

Preferably, the method includes the step of detecting a CAS signal on the subscriber loop and starting a timer in response to detection of the CAS signal.

Preferably, the method includes the step of defining a pre-ack delay period as a pre-defined period of time measured from detection of the CAS signal, the first and second windows of time falling within the pre-ack delay period.

Preferably, the method includes the step of determining whether or not a signal transition indicative of an extension-in-use occurs within a first or second half of the pre-ack delay period.

Preferably, the method includes the step of transmitting the first acknowledgement signal if the signal transition indicative of an extension-in-use occurs within the first half of the pre-ack delay period and transmitting the second acknowledgement signal if the signal transition indicative of an extension-in-use occurs within the second half of the pre-ack delay period.

Preferably, the method includes the step of disabling the transmission of the acknowledgement signal, and receiving FSK data from the subscriber loop when an ADSI detect flag is set active.

Preferably, the method includes the step of transmitting the acknowledgement signal includes transmitting a DTMF A after a pre-ack delay period from receipt of the CAS signal.

Preferably, the method includes the step of transmitting the acknowledgement signal includes transmitting a DTMF D after a pre-ack delay period from receipt of the CAS signal.

Preferably, the method includes the step of determining whether or not an extension is in use for a period of time less than or equal to the pre-ack delay period from receipt of the CAS signal and if so, setting an ADSI detect flag active according to whether or not the time elapsed since the CAS signal was detected is greater than the pre-ack delay period.

Preferably, the method includes the step of disabling the transmission of the acknowledgement signal when the ADSI detect flag is set active.

Preferably, the method includes the step of setting an ADSI detect flag active according to whether or not the time elapsed since the CAS signal was detected is greater than one-half of the pre-ack delay period.

Preferably, the method includes the step of transmitting the acknowledgement signal after the pre-ack delay period.

Preferably, the method includes the step of disabling the transmission of the acknowledgement signal when an ADSI detect flag is set active.

Preferably, the method includes the step of placing the subscriber loop in an on-hook state for a for a time period equal to one-half of a pre-ack delay time period from receipt of the CAS signal.

Preferably, the method includes the step of muting a receive path until FSK data is received.

Preferably, the method includes the step of waiting a period of time equal to the sum of one-half of the pre-ack delay period and an ack length period from receipt of the CAS signal prior to placing the subscriber loop in an off hook state.

In accordance with another aspect of the invention, there is provided an apparatus for signalling a telephone switch to indicate the presence of a telephone of a pre-defined type on a subscriber loop. The apparatus includes a sensor for sensing the subscriber loop to detect whether or not a telephone of a pre-defined type is connected to the subscriber loop. The apparatus further includes a transmitter for transmitting to the telephone switch a first acknowledgement signal if the telephone of the pre-defined type is connected to the subscriber loop and off-hook and transmitting to the telephone switch a second acknowledgement signal if the telephone of the pre-defined type is not off-hook.

Preferably, the sensor is operable to sense low frequency modulation on the subscriber loop, to detect whether or not the telephone of the pre-defined type is off-hook.

Preferably, the apparatus includes an analog to digital converter for monitoring the voltage or dc current on the subscriber loop to detect signal transitions indicative of an extension-in-use.

Preferably, the apparatus includes a processor for determining whether or not a signal transition indicative of an extension-in-use occurs within a pre-defined window of time.

Preferably, the apparatus includes a processor for determining whether or not a signal transition indicative of an extension-in-use occurs within first or second pre-defined windows of time.

Preferably, the transmitter is operable to transmit the first acknowledgement signal if the signal transition indicative of an extension-in-use occurs within the first window of time and transmit the second acknowledgement signal if the signal transition indicative of an extension-in-use occurs within the second window of time.

Preferably, the apparatus includes a CAS signal detector for detecting a CAS signal on the subscriber loop and a timer started in response to detection of the CAS signal.

Preferably, the apparatus includes a microprocessor for defining a pre-ack delay period as a pre-defined period of time measured from detection of the CAS signal, the first and second windows of time falling within the pre-ack delay period.

Preferably, the microprocessor is programmed to determine whether or not a signal transition indicative of an extension-in-use occurs within a first or second half of the pre-ack delay period.

Preferably, the microprocessor is operable to direct the transmitter to transmit the first acknowledgement signal if the signal transition indicative of an extension-in-use occurs within the first half of the pre-ack delay period and to transmit the second acknowledgement signal if the signal transition indicative of an extension-in-use occurs within the second half of the pre-ack delay period.

Preferably, the apparatus includes an ADSI detect flag register for storing an ADSI detect flag, and a microprocessor operable to control the transmitter, for disabling the transmission of the acknowledgement signal, and for receiving FSK data from the subscriber loop when the ADSI detect flag is set active.

Preferably, the microprocessor is programmed to direct the transmitter to transmit a DTMF A after a pre-ack delay period from receipt of the CAS signal.

Preferably, the microprocessor is programmed to direct the transmitter to transmit a DTMF D after a pre-ack delay period from receipt of the CAS signal.

Preferably, the apparatus includes a timer for determining whether or not an extension is in use for a period of time less than or equal to the pre-ack delay period from receipt of the CAS signal.

Preferably, the microprocessor is programmed to set an ADSI detect flag active according to whether or not the time elapsed since the CAS signal was detected is greater than the pre-ack delay period.

Preferably, the microprocessor is programmed to disable the transmission of the acknowledgement signal when the ADSI detect flag is set active.

Preferably, the microprocessor is programmed to set an ADSI detect flag active when the time elapsed since the CAS signal was detected is greater than one-half of the pre-ack delay period.

Preferably, the microprocessor is programmed to transmit the acknowledgement signal after the pre-ack delay period.

Preferably, the apparatus includes an ADSI detect flag register for storing an ADSI detect flag and preferably, the microprocessor is programmed to disable the transmission of the acknowledgement signal when the ADSI detect flag is set active.

Preferably, the microprocessor is programmed to place the subscriber loop in an on-hook state for a for a time period equal to one-half of a pre-ack delay time period from receipt of the CAS signal.

Preferably, the microprocessor is programmed to mute a receive path until FSK data is received.

Preferably, the microprocessor is programmed to wait a period of time equal to the sum of one-half of the pre-ack delay period and an ack length period from receipt of the CAS signal prior to placing the subscriber loop in an off hook state.

BRIEF DESCRIPTION OF THE DRAWINGS

In drawings which illustrate embodiments of the invention.

DETAILED DESCRIPTION

Figure 1:
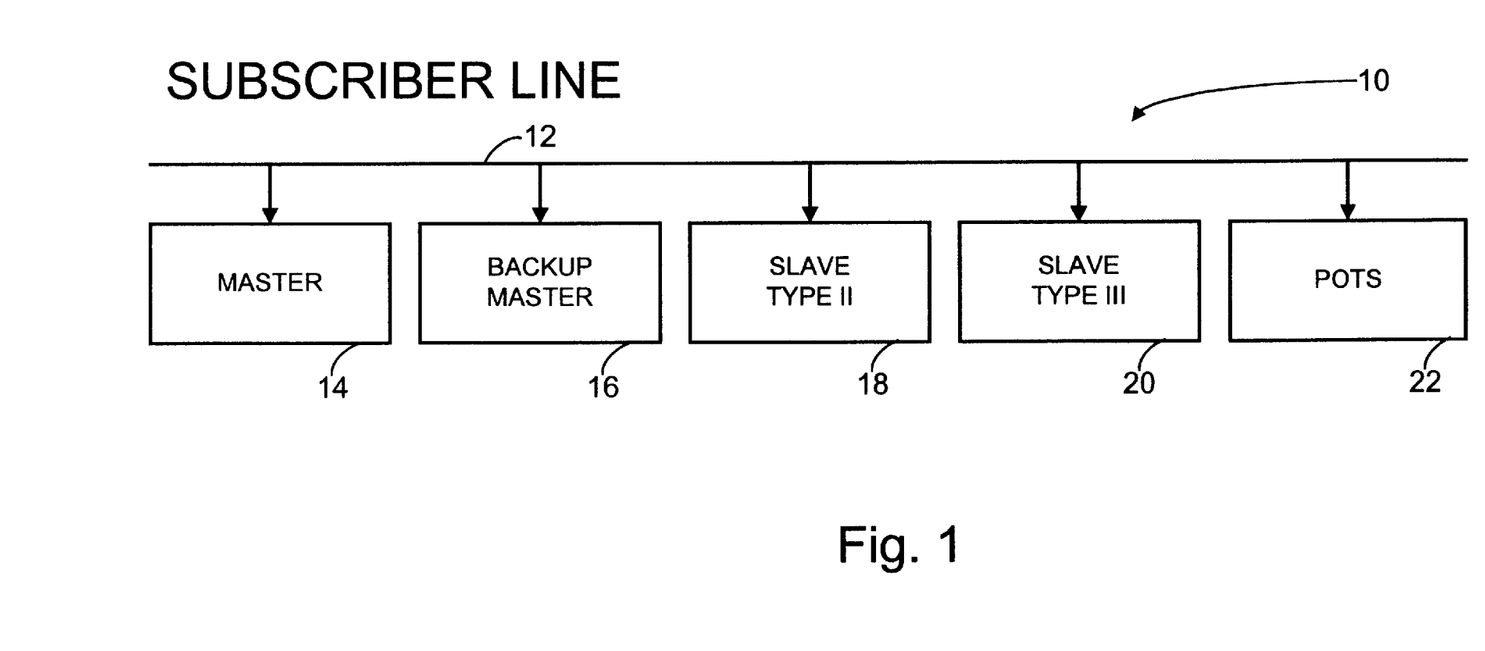
FIG. 1 is a block diagram of a subscriber end of a subscriber loop with a plurality of telephones connected thereto, according to a first embodiment of the invention.

Referring to FIG. 1, a subscriber telephone system is shown generally at 10.

The subscriber telephone system is shown connected to a subscriber loop 12 and includes master telephone 14, a backup master telephone 16, a slave type II telephone 18, a slave type III telephone 20 and a Plain Old Telephone Service (POTS) telephone 22. Each of these telephones may be simultaneously in use or connected to the subscriber loop 12 at anytime during a telephone call. Furthermore, any of the telephones may be placed onhook during a call.

A master telephone is a telephone which is regarded as one which sends acknowledgment signals to a telephone switch connected to the subscriber loop in response to signalling provided to the master telephone to the telephone switch.

The backup master telephone acts as a backup to the master telephone 14 and is defined as the telephone last to send an acknowledgment signal to the subscriber loop.

The slave type II telephone 18 is a telephone which is not capable of transmitting an acknowledgement signal back to the telephone switch but is capable of displaying SCWID/CLID information sent by the switch.

The slave type III telephone 20 is a telephone which is not capable of sending an acknowledgment signal to the telephone switch but which is capable of displaying SCWID/CLID information and which is capable of providing features according to the ADSI protocol.

The POTS telephone 22 is a conventional "plain old telephone services" telephone incapable of transmitting an acknowledgment signal and incapable of displaying SCWID/CLID information. For the purposes of this case, POTS can be taken to mean nay telephone not equipped with the algorithms described herein, whether or not it is a type II/type III set.

Either the master telephone 14 or the backup master telephone 16 is capable of sending an acknowledgement signal to the telephone switch and provisions are made in each to arbitrate which one will send the acknowledgement signal as described in U.S. patent application Ser. No. 08/832,838 to Kos, et al.

The master telephone 14 and backup master telephone 16 are capable, however, of determining whether or not extensions including the slave type II telephone 18, the slave type III telephone 20 or the POTS telephone 22 are in use at the time a caller alert signal is received from the telephone switch on the subscriber loop 12.

Figure 2:
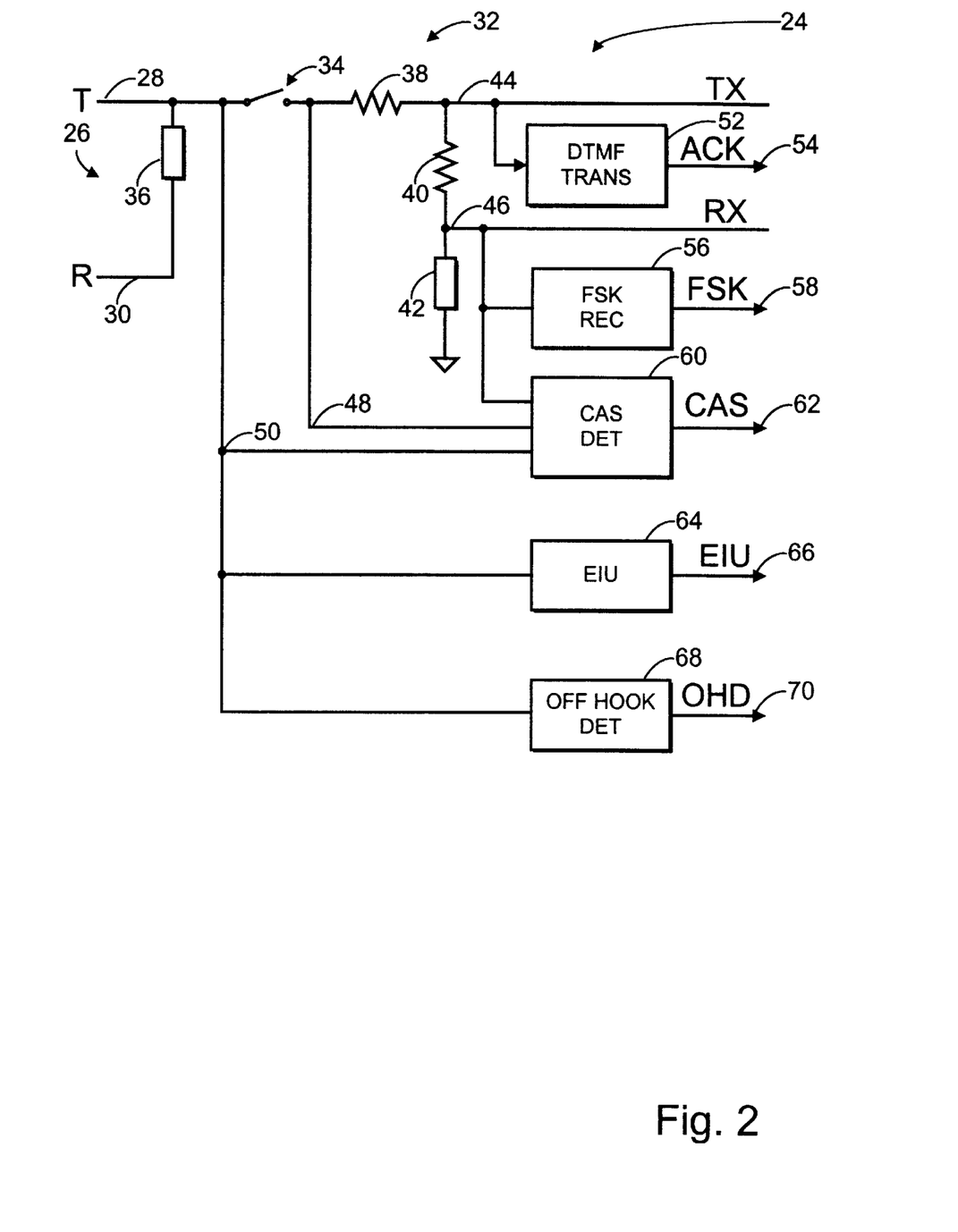
FIG. 2 is a functional block diagram of a subscriber loop interface, according to the first embodiment of the invention.
Figure 3:
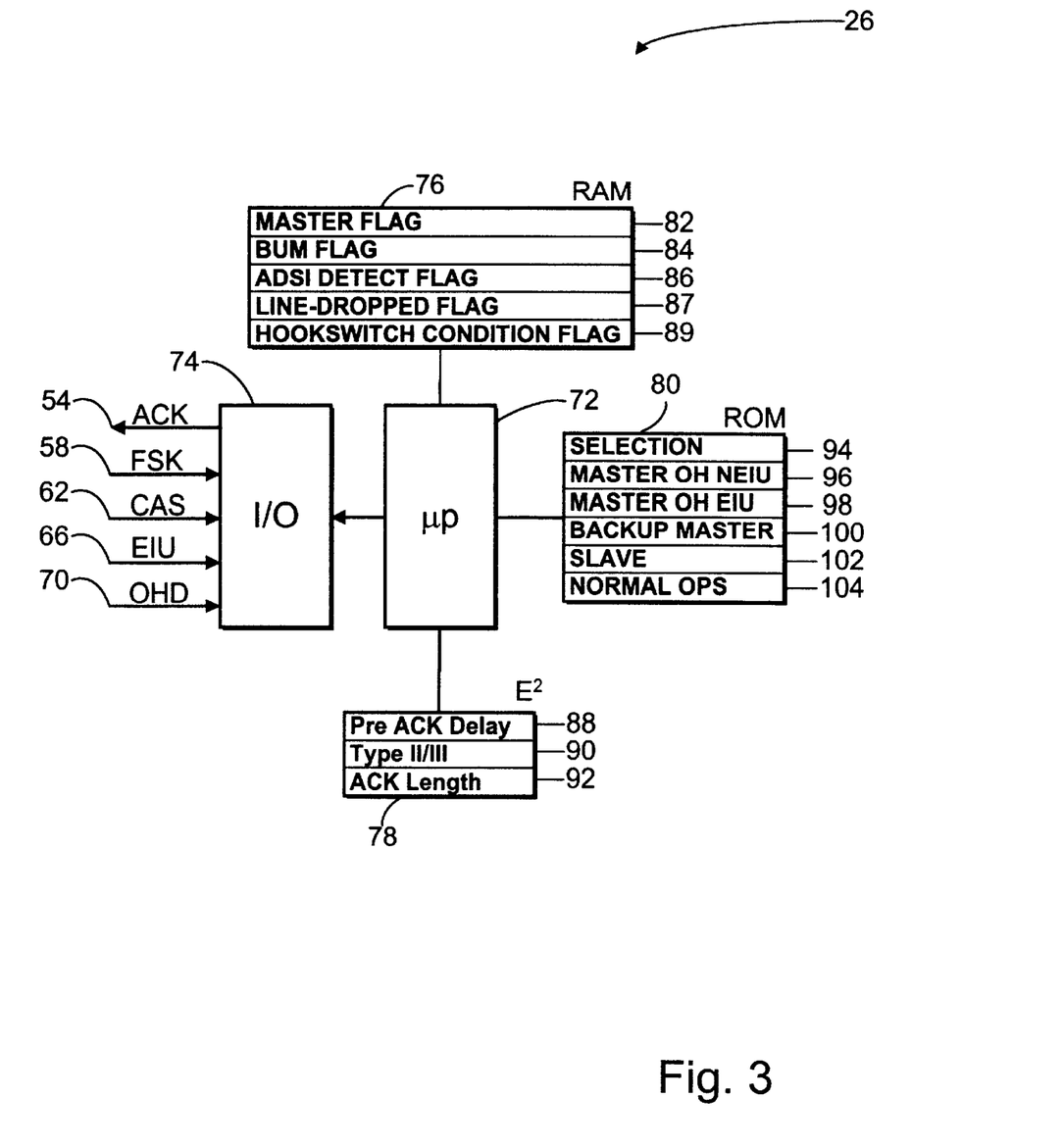
FIG. 3 is a block diagram of a microprocessor circuit, according to the first embodiment of the invention.

FIG. 2 AND 3

Referring to FIGS. 2 and 3, a functional block diagram of hardware employed in a master telephone or backup master telephone such as depicted in FIG. 1 at 14 and 16, is shown generally at 24 and 26 respectively in FIGS. 2 and 3 respectively. Generally, this hardware acts as an apparatus for signalling a telephone switch to indicate the presence of a telephone of a pre-defined type on a subscriber loop.

Referring to FIG. 2, the hardware includes tip and ring line terminations 28 and 30 which are connected to a conventional telephone hybrid transmission circuit shown generally at 32.

The hybrid circuit 32 includes a hookswitch 34 and first, second, third and fourth impedances 36, 38, 40 and 42.

Various signal lines are connected to the hybrid circuit, including a transmit circuit line 44, a receive circuit line 46, an offhook caller alerting signal (CAS) detect line and a subscriber loop monitor signal line 50.

The transmit circuit line 44 is connected to a transmit circuit (not shown), for transmitting signals from a handset (not shown) of the telephone to the telephone switch. The transmit circuit line 44 is further connected to a dual tone multi-frequency (DTMF) transmitter 52 responsive to an acknowledgment signal 54, for transmitting DTMF signals to the telephone switch. The DTMF transmitter acts as a transmitter for transmitting to the telephone switch a first acknowledgement signal if said telephone of said predefined type is connected to said subscriber loop and off-hook and transmitting to said telephone switch a second acknowledgement signal if said telephone of said predefined type is not off-hook.

The receive circuit line 46 is connected to a receive circuit of the telephone (not shown) for providing signals from the subscriber loop 12 to the handset (not shown) of the telephone. The receive signal line is further connected to a frequency shift keyed (FSK) receiver 56 for providing an FSK receive signal 58. The receive circuit line 46 is further connected to a CAS detection circuit 60 which produces a local CAS signal 62 when a CAS signal is received from the telephone switch via the subscriber loop 12. The offhook signal line 48 and the subscriber loop monitor signal line 50 are also connected to the CAS detection circuit 60 and are used in rendering the local CAS signal 62 active in the conventional manner.

The subscriber loop monitor signal line 50 is further connected to an extension-in-use detector 64 which produces a local extension-in-use (EIU) signal 66, indicative of whether or not an extension is in use. Thus, referring to FIG. 1, when any of the telephones 16, 18, 20 or 22 is offhook at the same time as the master telephone 14, the extension-in-use detector 64 would render the local extension-in-use signal 66 active. In general, the local extension-in-use detector 64 renders the local extension-in-use signal 66 active or inactive in response to changes in the local extension-in-use status of the subscriber loop 12. The extension-in-use sensor thus acts as a sensor for sensing the subscriber loop to detect whether or not a telephone of a predefined type is connected to the subscriber loop. In effect, the extension-in-use detector senses low frequency modulation on the subscriber loop, to detect whether or not a telephone of a predefined type is off-hook. In this embodiment, the extension-in-use detector includes an analog to digital converter for monitoring voltage on said subscriber loop to detect signal transitions indicative of an extension-in-use.

The subscriber loop monitor signal line 50 is further connected to an offhook detector 68 which renders active an offhook detect signal (OHD) 70 when the hookswitch 34 is closed. An active off-hook detect signal 70 represents that the hardware of the telephone in which the hardware is situated is off-hook.

FIG. 3

Referring to FIG. 3, a microprocessor circuit according to the invention is shown generally at 26.

The microprocessor includes a microprocessor 72 in communication with an I/O port 74, random access memory (RAM) 76, electrically erasable, programmable read only memory ($E^2$ or EEPROM) 78 and read only memory (ROM) 80. The acknowledgement signal 54 is generated by the I/O port 74 in response to signals provided by the microprocessor 72. The I/O port is also operable to receive the FSK receive signal 58, the local CAS signal 62, the EIU signal 66 and the OHD signal 70 and provide representations of these signals to the microprocessor.

The RAM 76 is configured by the microprocessor 72 to include a master flag register 82, a backup master (BUM) flag register 84 and an ADSI detect flag register 86, a line dropped flag register 87 and a hookswitch condition register 89.

The EEPROM is configured by the microprocessor 72 to include a pre-ack delay register 88, a type II/type III flag register 90 and an ack-length time register 92 for storing values by the same names.

The ROM 80 is used to store blocks of code for directing the microprocessor to interact with the FSK, CAS, EIU and OHD signals, 58, 62, 66 and 70 to produce an acknowledgement signal 54 according to the status of these signals and the contents of the flag registers in the RAM and contents of the registers in the EEPROM. The first block of code 94 directs the microprocessor 72 to execute a selection algorithm. A second block of code 96 directs the microprocessor to execute a master offhook/no extension-in-use algorithm. A third block of code 98 directs the microprocessor to execute a master onhook extension-in-use algorithm. A fourth block of code 100 directs the microprocessor to execute a backup master algorithm. A fifth block of code 102 directs the microprocessor to execute a slave algorithm and a sixth block of code 104 to execute normal telephone operations such as conventional operations normally handled by a microprocessor in a telephone.

Figure 4:
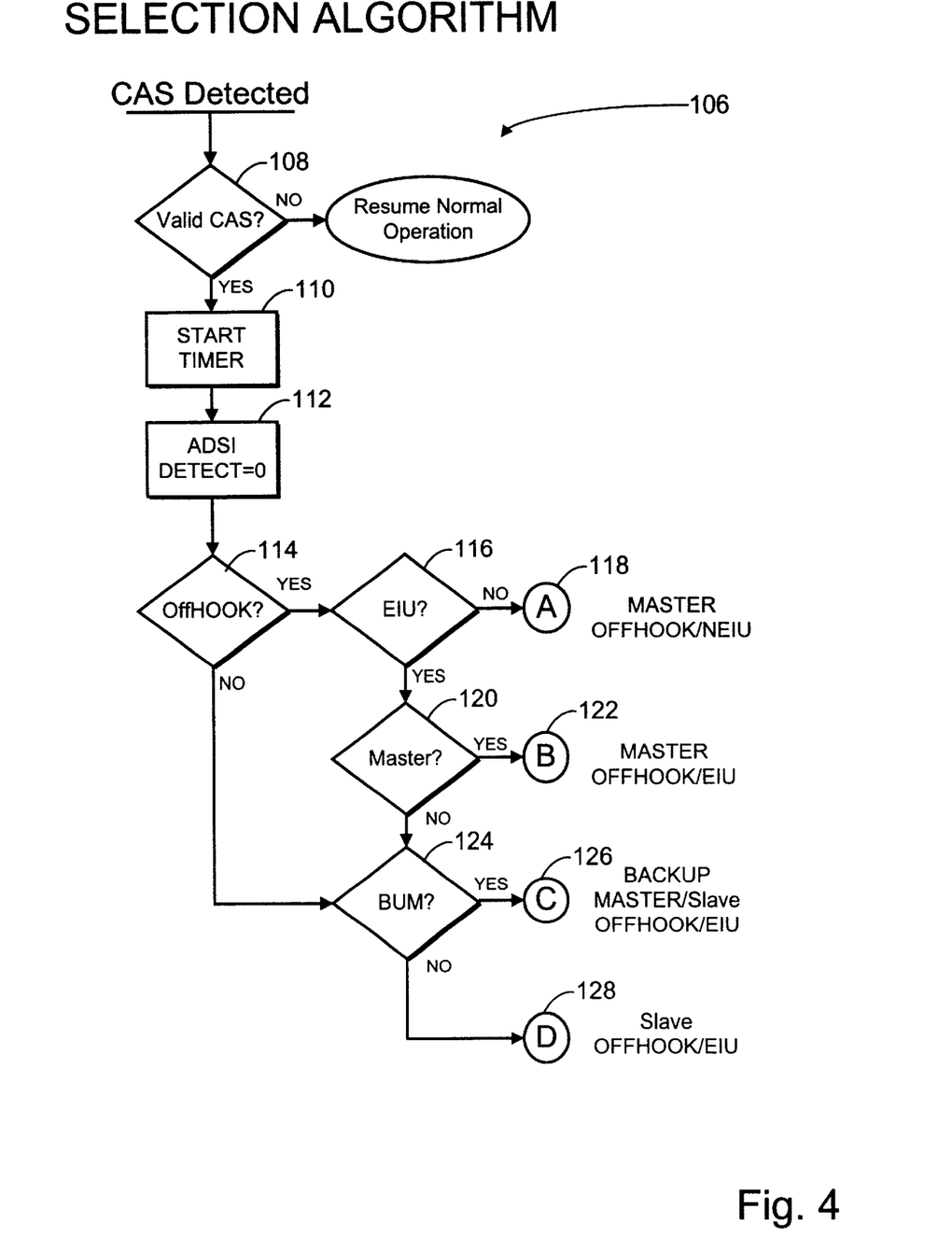
FIG. 4 is a flowchart of a selection algorithm, according to the first embodiment of the invention.

FIG. 4

Selection Algorithm

Referring to FIG. 4, the selection algorithm representing blocks of code executed by the microprocessor is shown generally at 106.

The selection algorithm is invoked upon receipt of an active local CAS signal 62 in FIG. 3, at the microprocessor 72. Upon invocation of the selection algorithm, a first block, block 108, directs the microprocessor to read the I/O port to determine whether or not a valid local CAS signal 62 has been received according to well known CAS verification principles. If no valid local CAS signal 62 has been received, the microprocessor is directed to resume normal operation and is directed to the normal telephone operations code 104 shown in FIG. 3.

If a valid local CAS signal 62 has been received, block 110 directs the microprocessor to start a timer routine for keeping track of the time elapsed from receipt of the valid local CAS signal 62. Thus, the apparatus includes a CAS signal detector for detecting a CAS signal on the subscriber loop and a timer started in response to detection of the CAS signal.

Block 112 then directs the microprocessor to set the contents of the ADSI detect flag register 86 shown in FIG. 3 to zero, to clear this register.

Block 114 then directs the microprocessor to read the I/O port to determine whether or not the offhook detect signal 70 is active and store the condition of this signal in the hookswitch condition register 89. If the offhook signal is active, the microprocessor is directed to block 116 which directs the microprocessor to read the I/O port to check the status of the local extension-in-use signal 66. If the extension-in-use is not active, the microprocessor is directed to the master offhook/no extension-in-use algorithm as indicated generally at 118.

If, on the other hand, the local extension-in-use signal 66 is active, the microprocessor is directed to block 120 which directs the microprocessor to read the contents of the master flag register 82 to determine whether or not the telephone is a master telephone. If the telephone is a master telephone, the microprocessor is directed to the master offhook extension-in-use algorithm as shown generally at 122.

If at block 120, the contents of the master flag register 82 indicate that the telephone is not a master, the microprocessor is directed to block 124 which directs the microprocessor to read the contents of the backup master flag register 84 to determine whether or not the telephone is a backup master. If the telephone is a backup master then the microprocessor is directed to the backup master algorithm as indicated generally at 126.

If at block 124, the backup master flag register 84 status indicates that the telephone is not a backup master, the microprocessor is directed to the slave algorithm as indicated generally at 128.

Referring back to block 114 in FIG. 4, if at that block, the microprocessor determined that the offhook detect signal 70 was inactive, the microprocessor is directed to block 124 to perform functions as described above.

Thus, the selection algorithm acts to determine which of the subsequent algorithms the microprocessor should be directed to, on the basis of the offhook detect signal 70, the local extension-in-use signal 66, the contents of the master flag register 82 and the contents of the backup flag register 84.

Figure 5:
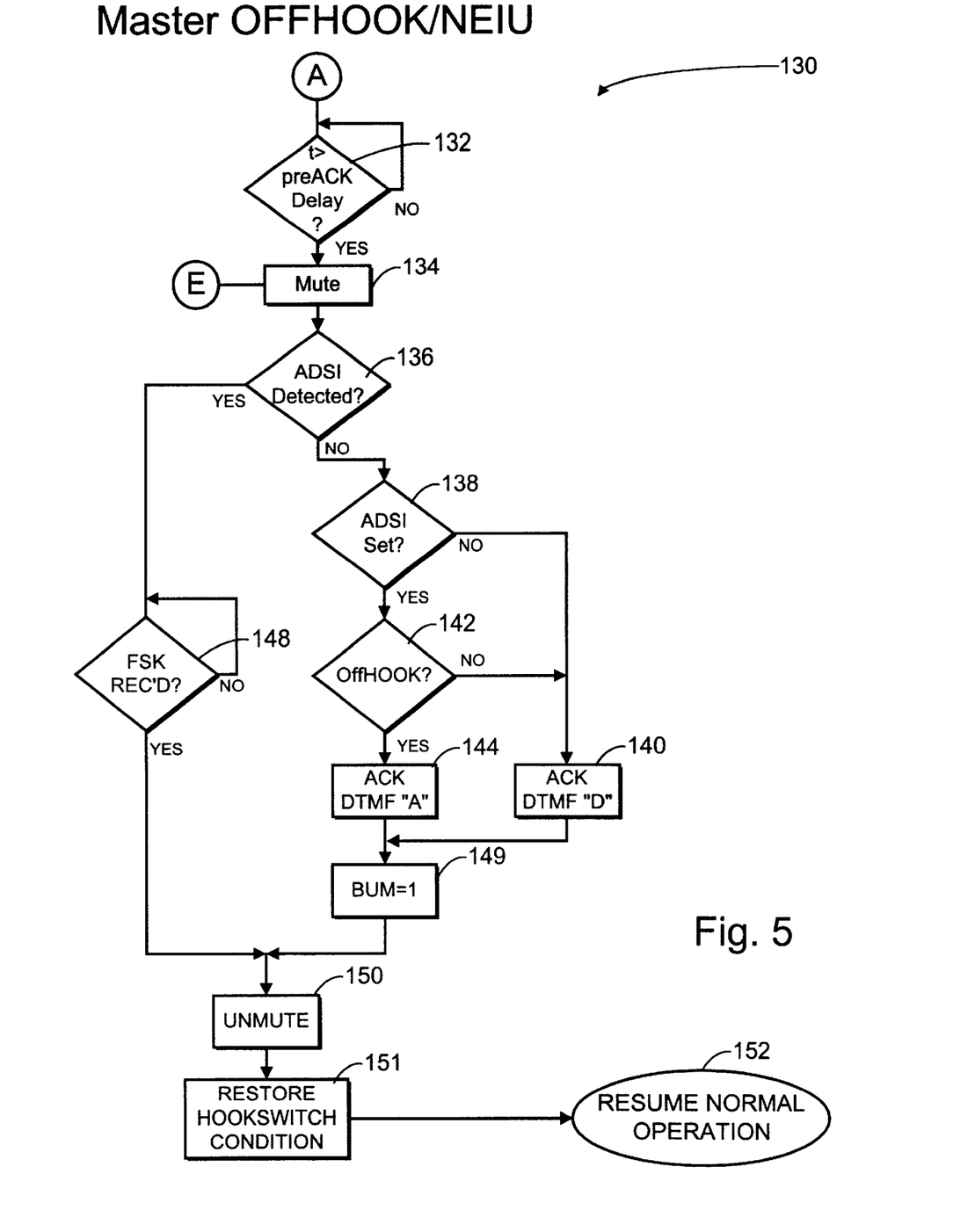
FIG. 5 is a flowchart of a master offhook/NEIU algorithm, according to the first embodiment of the invention.

FIG. 5

Master Offhook/No Extension-in-Use

Referring to FIG. 5, the master off-hook/no extension-in-use algorithm is shown generally at 130. This algorithm begins with block 132 which determines whether the time elapsed is greater than the contents of the pre-ack delay register 88, shown in FIG. 3. The microprocessor continues to check the time elapsed against the contents of the pre-ack delay register 88 until the time elapsed is greater than the pre-ack delay value stored in the pre-ack delay register 88.

When the time elapsed exceeds the pre-ack delay value, block 134 directs the microprocessor to mute the receive path or, in other words, prevent the receive signal appearing on the receive circuit line 46 in FIG. 2 from reaching the handset (not shown).

Block 136 then directs the microprocessor to read the contents of the ADSI detect flag register 86 to determine whether or not the contents of this register are set to indicate that ADSI is detected.

Block 138 then directs the microprocessor to read the contents of the type II/type III flag register 90 to determine whether to not the type II/type III flag is set to indicate that the telephone is ADSI compliant, or, in other words, is able to receive ADSI information. If the telephone is not ADSI compliant (ie. type III), the microprocessor is directed to block 140, which directs the microprocessor to generate an acknowledgement signal 54 to cause the DTMF transmitter 52, shown in FIG. 2, to transmit a DTMF "D" to the telephone switch.

If at block 138, the type II/type III flag stored in the type II/type III flag register 90 indicates that the telephone is ADSI compliant, the microprocessor is directed to block 142 which directs the microprocessor to read the status of the offhook detect signal 70 to determine whether or not the telephone is offhook. If the telephone is not offhook, the microprocessor is directed to block 140 to send a DTMF "D" to the telephone switch.

If, however, the telephone is offhook, the microprocessor is directed to block 144 to send a DTMF "A" to the telephone switch. Thus, the microprocessor is programmed to direct the transmitter to transmit a DTMF A after a pre-ack delay period from receipt of the CAS signal and to direct the transmitter to transmit a DTMF D after a pre-ack delay period from receipt of the CAS signal, depending on the contents of the type II/type III flag register.

The microprocessor is then directed to block 148 which directs the microprocessor to read the FSK receive signal 58 to accept FSK data from the telephone switch. The FSK data includes codes which indicate the end of the FSK data and when such data successfully has been received, the microprocessor is then directed to block 149 which directs it to store an active BUM flag value in the BUM flag register 84 to indicate that the telephone should be regarded as a backup master in response to receipt of the next CAS.

The microprocessor is then directed to block 150 which causes it to unmute the receive path such that the handset (not shown) is able to receive signals from the receive circuit line 46.

Block 151 then directs the microprocessor to restore the hookswitch to the condition it was in when the CAS signal was received from the telephone switch, as indicated by the contents of the hookswitch condition register 89.

Block 152 then directs the microprocessor to the normal telephone operations code 104 shown in FIG. 3.

Figure 6:
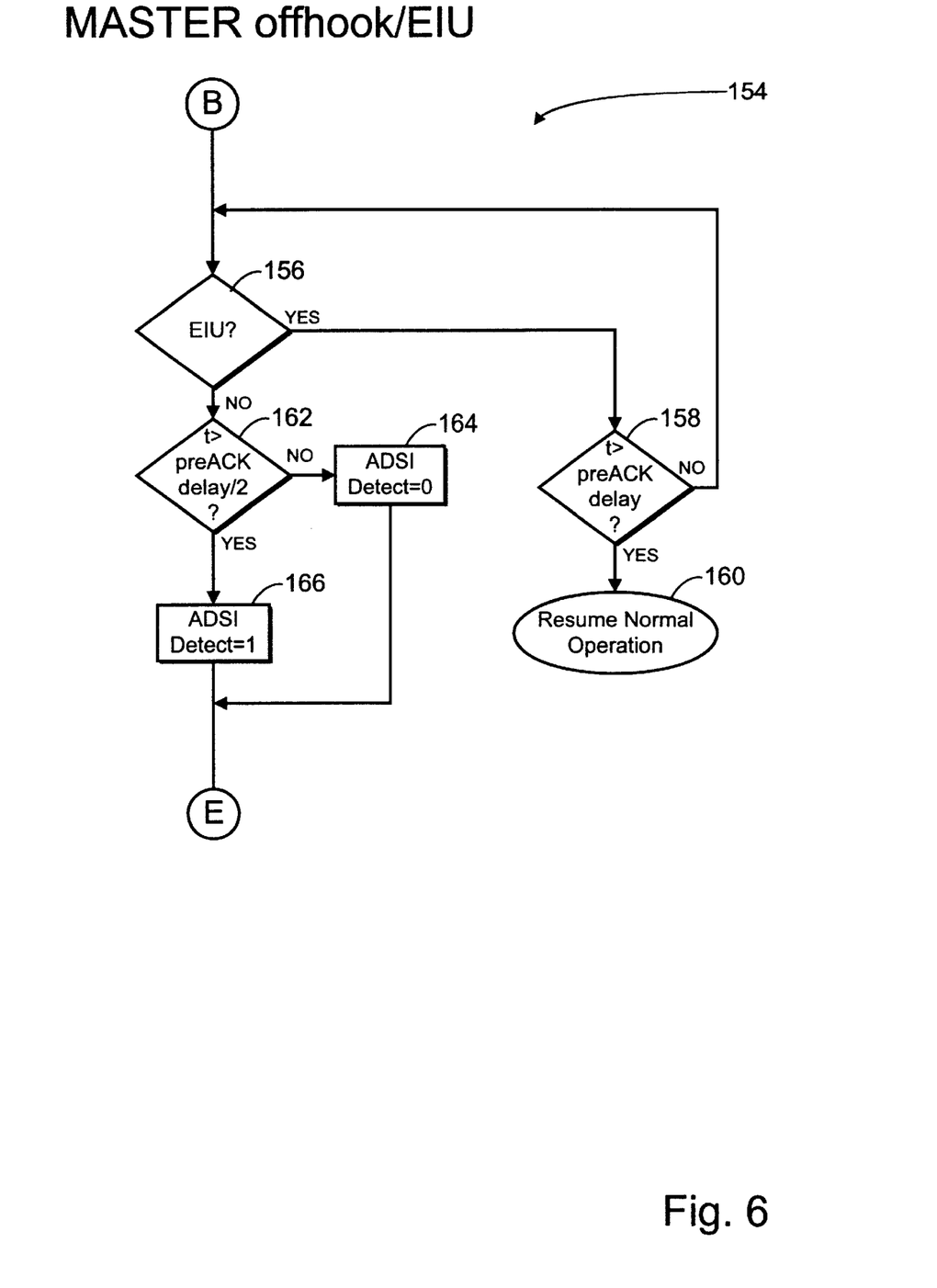
FIG. 6 is a flowchart of a master offhook/EIU algorithm, according to the first embodiment of the invention.

FIG. 6

Master Offhook/EIU

Referring to FIG. 6, the master offhook/EIU algorithm is shown generally at 154. This algorithm begins with block 156 which directs the microprocessor to again check the status of the local extension-in-use signal 66 to determine whether or not an extension is in use. If an extension is in use, block 158 directs the microprocessor to compare the time elapsed with the contents of the pre-ack delay register 88 to determine whether or not the time elapsed is greater than the pre-ack delay value. If this value is not greater than the pre-ack delay value, the microprocessor is directed back to block 156. If, however, the time elapsed is greater than the pre-ack delay value, block 160 directs the microprocessor back to the normal telephone operations code 104 shown in FIG. 3.

Referring back to FIG. 6, if at block 156, the microprocessor detects the local extension-in-use signal 66 to be inactive, indicating an extension is not in use, the microprocessor is directed to block 162 which directs it to compare the time elapsed with one-half of the pre-ack delay value stored in the pre-ack delay register 88, shown in FIG. 3.

Referring back to FIG. 6, if the time elapsed is not greater than one-half of the pre-ack delay value, the microprocessor is directed to block 164 which causes the microprocessor to set the contents of the ADSI detect flag register 86 to zero or inactive. However, if the time elapsed is greater than one-half of the pre-ack delay value, the microprocessor is directed to block 166 which causes it to load into the ADSI detect flag register 86 value indicating the telephone is ADSI compliant.

Upon completion of either block 164 or 166, the microprocessor is directed to block 134 of FIG. 5 to continue processing with blocks 134 through 152.

In effect, if an extension remains in use for a period of time greater than a pre-ack delay, identified by the pre-ack delay register 88, the microprocessor is directed to resume normal operation without transmitting an acknowledgement signal. Thus, the microprocessor is programmed to set an ADSI detect flag active when the time elapsed since the CAS signal was detected is greater than the pre-ack delay period and to disable the transmission of the acknowledgement signal when the ADSI detect flag is set active. In addition, the processor for determines whether or not an extension is in use for a period of time less than or equal to the pre-ack delay period from receipt of the CAS signal.

On the other hand, if the local extension-in-use signal 66 becomes inactive within a first half or first window of time within the pre-ack delay period, the ADSI detect flag is set active such that a DTMF "A" signal is transmitted to the telephone switch. If the extension-in-use signal 66 becomes inactive with a second half or second window of time within the pre-ack delay period, the ADSI detect flag is set inactive and a DTMF "D" signal is transmitted to the telephone switch. Thus, the processor determines whether or not a signal transition indicative of an extension-in-use occurs within first or second pre-defined windows of time and the DTMF transmit is operable to transmit a first acknowledgement signal if a signal transition indicative of an extension-in-use occurs within the first window of time and transmit the second acknowledgement signal if the signal transition indicative of an extension-in-use occurs within the second window of time. It will be appreciated that the microprocessor defines a pre-ack delay period as a pre-defined period of time measured from detection of the CAS signal, and that the first and second windows of time fall within the pre-ack delay period. More generally, the microprocessor is programmed to determine whether or not a signal transition indicative of an extension-in-use occurs within a first or second half of the pre-ack delay period. The microprocessor is operable to direct the transmitter to transmit the first acknowledgement signal if a signal transition indicative of an extension-in-use occurs within the first half of the pre-ack delay period and to transmit the second acknowledgement signal if a signal transition indicative of an extension-in-use occurs within the second half of the pre-ack delay period.**

Figure 7:
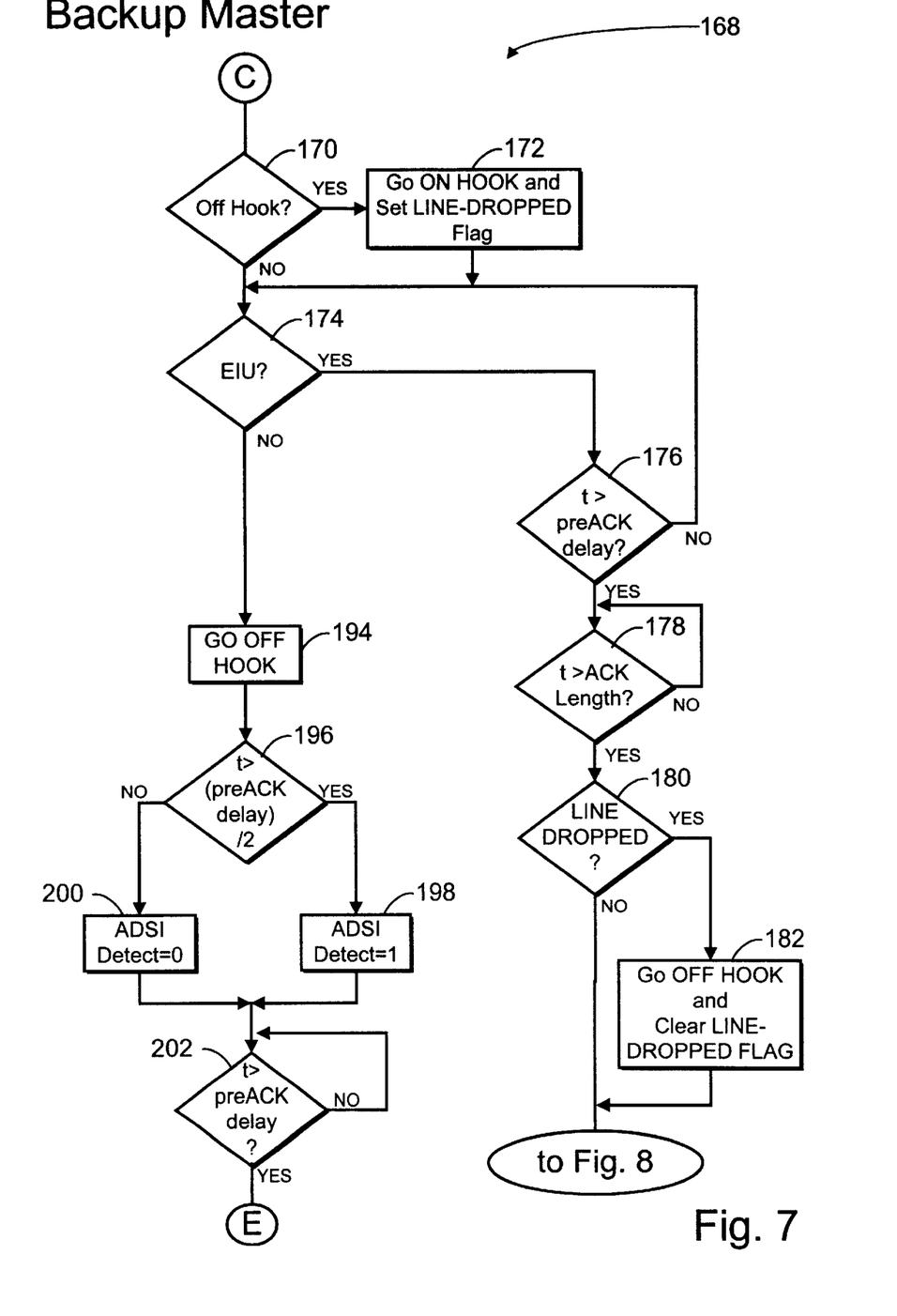
FIG. 7 is a flowchart of a backup master algorithm, according to the first embodiment of the invention.

FIG. 7

Backup Master

Referring to FIG. 7, the backup master algorithm is shown generally at 168. The backup master algorithm begins with block 170 which directs the microprocessor to determine whether or not the offhook detect signal 70 is active. If this signal is active, block 172 directs the microprocessor to open the hookswitch 34 to place the telephone onhook temporarily and to set the line dropped flag 87 contents active. If the telephone is already onhook or has just been placed onhook, the microprocessor is directed to block 174 which causes it to check the status of the local extension-in-use signal 66.

If at block 174, the local extension-in-use signal is active, the microprocessor is directed to block 176 which directs it to determine whether or not the time elapsed is greater than the pre-ack delay value stored in the pre-ack delay register 88. If not, the microprocessor is directed back to block 174. If the time elapsed is greater than the pre-ack delay value, however, the microprocessor is directed to block 178 which directs the microprocessor to determine whether or not the time elapsed is greater than the ack-length value stored in the ack-length time register 92 shown in FIG. 3. The microprocessor continually compares the time elapsed with the ack-length value stored in the ack-length register until the time elapsed exceeds the ack-length value. When this occurs, the microprocessor is directed to block 180 which directs the microprocessor to check the status of the line dropped flag 87 to determine whether or not the line was dropped at block 172. If the telephone is onhook, block 182 directs the microprocessor to close the hookswitch to place the telephone offhook and to clear the line dropped flag 87. The microprocessor is then directed to block 184 shown in FIG. 8. Block 184 directs the microprocessor to mute the receive path as described above. The microprocessor is then directed to block 186 which directs it to receive FSK data until all FSK data is received after which time the microprocessor is directed to block 188 which directs it to set the contents of the BUM flag register 84 to zero, indicating an inactive BUM status. The microprocessor is then directed to block 190 causing it to unmute the receive path.

Figure 8:
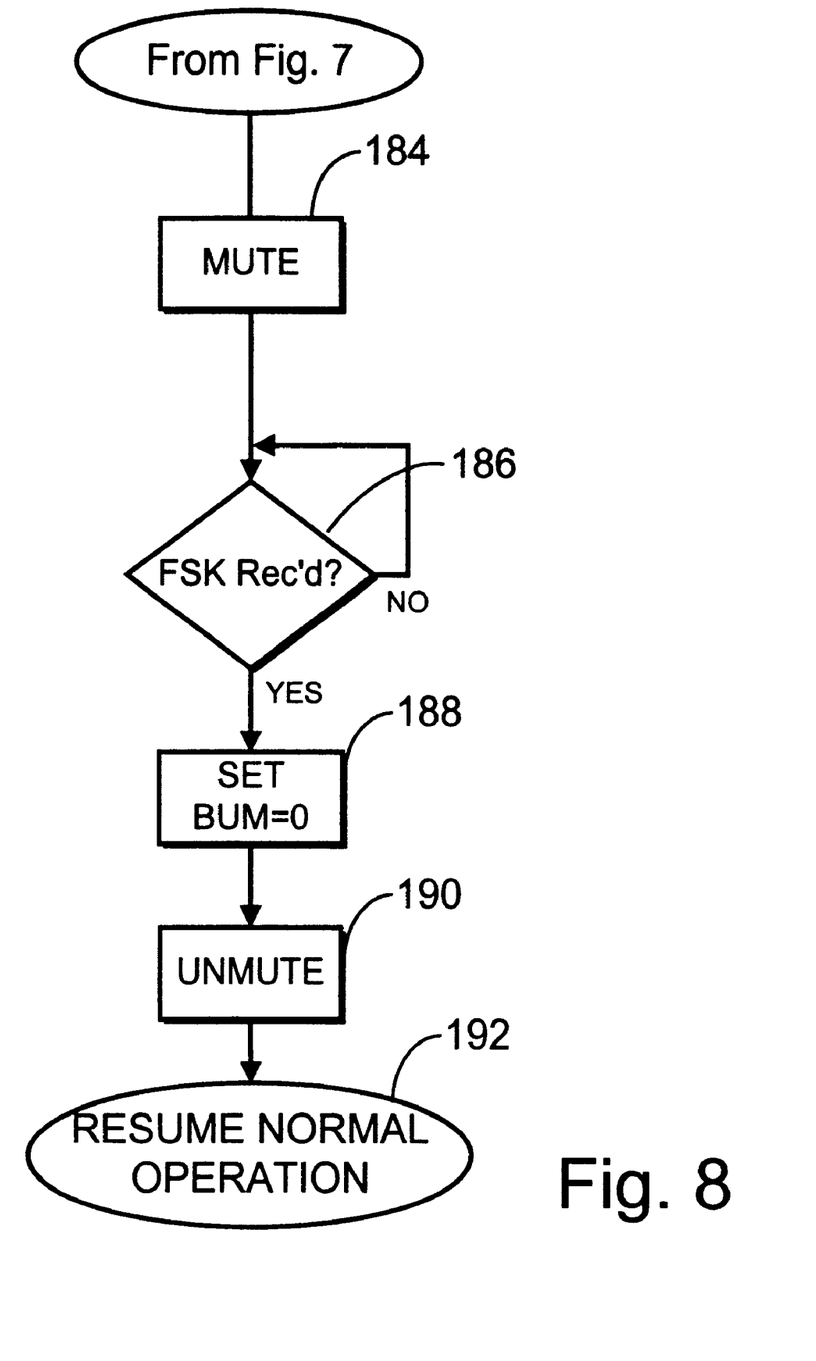
FIG. 8 is a continuation of the backup master algorithm shown in FIG. 7.

Finally, the microprocessor is directed to resume normal operation as indicated generally at 192.

Referring back to FIG. 7, if at block 174, the local extension-in-use signal 66 is inactive, block 194 directs the microprocessor to close the hookswitch 34 to place the telephone offhook. Block 196 then directs the microprocessor to determine whether or not the time elapsed is greater than one-half of the pre-ack delay value stored in the pre-ack delay register 88. If the time elapsed is greater than one-half of the pre-ack delay value, the microprocessor is directed to block 198 which causes it to set the ADSI detect flag register 86 contents to 1, or active. If, on the other hand, the time elapsed is not greater than one-half of the pre-ack delay value, the microprocessor is directed to block 200 which directs it to set the contents of the ADSI detect flag register 86 to zero, or inactive. Thus, microprocessor is programmed to set an ADSI detect flag active according to whether or not the time elapsed since the CAS signal was detected is greater than one-half of said pre-ack delay period.

The microprocessor is then directed to block 202 where it determines whether or not the time elapsed is greater than the pre-ack delay value stored in the pre-ack delay register 88. The microprocessor continually checks the time elapsed against the pre-ack delay value until the time elapsed exceeds the pre-ack delay value, at which time the microprocessor is directed to block 134 shown in FIG. 5 where it continues by executing blocks 134 through 152 as described above. In effect, microprocessor is programmed to transmit the acknowledgement signal after the pre-ack delay period and is programmed to disable the transmission of an acknowledgement signal when the ADSI detect flag is set active.

Figure 9:
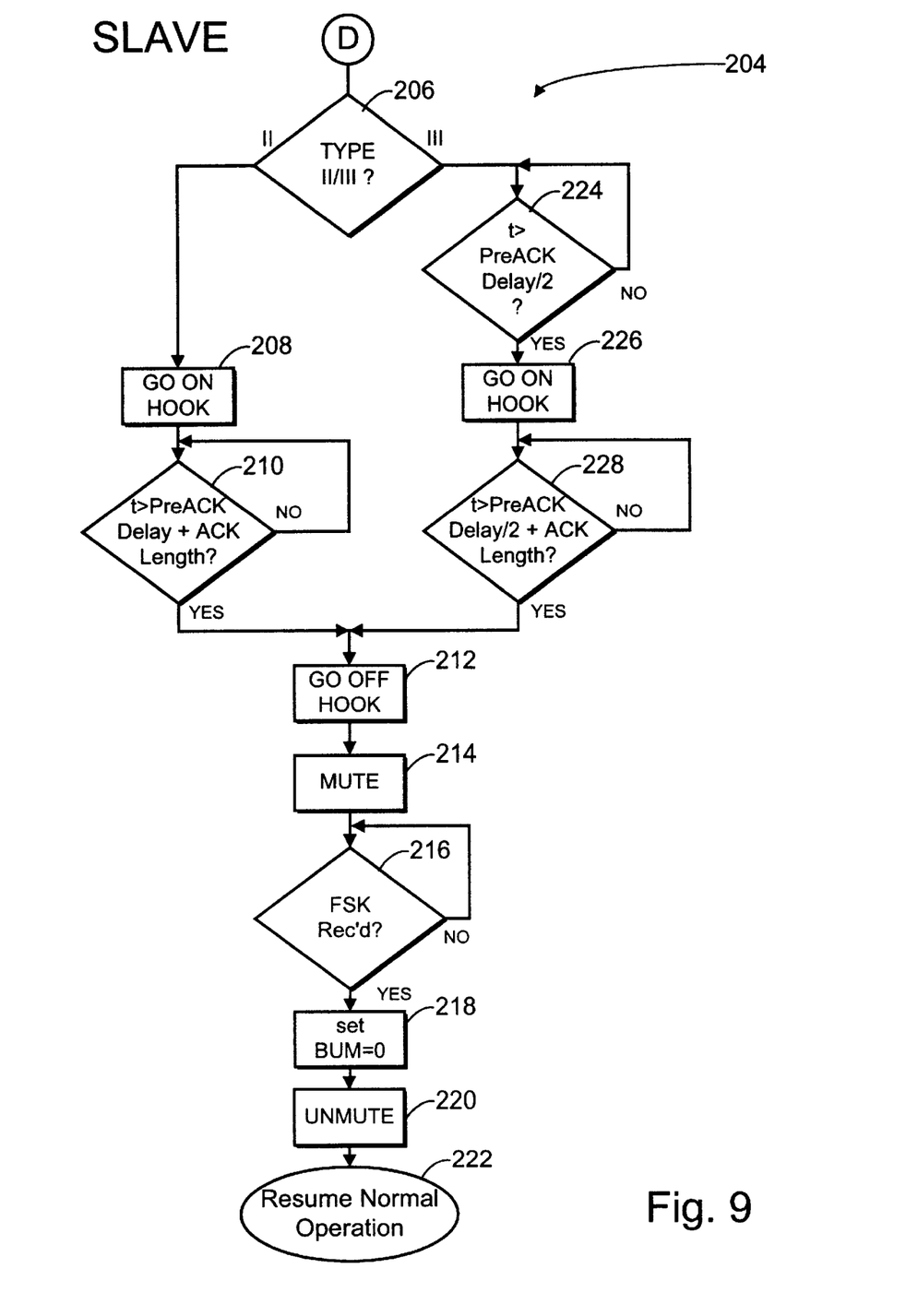
FIG. 9 is a flowchart of a slave algorithm, according to the first embodiment of the invention.

FIG. 9

Slave

Referring to FIG. 9, the slave algorithm is shown generally at 204. The slave algorithm begins with block 206 which directs the microprocessor to read the contents of the type II/type III flag register 90 to determine whether or not the telephone is a type II or type III telephone.

If the telephone is a type II telephone, block 208 directs the microprocessor to open the hookswitch 34 to place the telephone onhook. Block 210 then directs the microprocessor to determine whether or not the time elapsed is greater than the sum of the pre-ack delay value stored in the pre-ack delay register 88 and the ack-length value stored in the ack-length time register 92. The microprocessor continues to execute this block until this condition occurs. When this condition occurs, the microprocessor is directed to block 212 which causes the microprocessor to close the hookswitch 34 to place the telephone offhook. Thus, microprocessor is programmed to wait a period of time equal to the sum of one-half of the pre-ack delay period and an ack length period from receipt of the CAS signal prior to placing the subscriber loop in an off hook state. The microprocessor is then directed to block 214 which directs it to mute the receive path and block 216 directs the microprocessor to receive FSK data until all such FSK data is received. Thus, the microprocessor is programmed to mute a receive path until FSK data is received. The microprocessor is then directed to block 218 where it sets the contents of the BUM flag register 84 to zero, or inactive, to indicate that the telephone is not a backup master and block 220 directs the microprocessor to unmute the receive path as described above. Block 222 then directs the microprocessor back to the normal telephone operations code 104 shown in FIG. 3.

If at block 206, the contents of the type II/type III flag register 90 indicate that the telephone is a type III telephone, block 224 directs the microprocessor to determine whether or not the time elapsed is greater than one-half of the pre-ack delay value stored in the pre-ack delay register 88. The microprocessor remains at block 224 until the time elapsed exceeds one-half of the pre-ack delay value, at which time the microprocessor is directed to block 226 which causes it to open the hookswitch 34 thereby placing the telephone onhook. Thus, the microprocessor is programmed to place the subscriber loop in an on-hook state for a for a time period equal to one-half of a pre-ack delay time period from receipt of the CAS signal.

The microprocessor is then directed to block 226 to determine whether or not the time elapsed is greater than the sum of one-half of the pre-ack delay value stored in the pre-ack delay register 88 and the ack-length value stored in the ack-length time register 92. The microprocessor remains at block 226 until this condition occurs at which time it continues processing with blocks 212 through 222 as above.

While specific embodiments of the invention have been described and illustrated, such embodiments should be considered illustrative of the invention only and not as limiting the invention as construed in accordance with the accompanying claims.

What is claimed is:

1. A method of signalling a telephone switch to indicate the presence of a telephone of a predefined type on a subscriber loop, the method including the steps of:

a) sensing said subscriber loop to detect whether or not a telephone of a predefined type is connected to said subscriber loop;

b) transmitting to said telephone switch a first acknowledgement signal if said telephone of said predefined type is connected to said subscriber loop and off-hook and transmitting to said telephone switch a second acknowledgement signal if said telephone of said predefined type is not off-hook.

2. A method as claimed in claim 1 further including the step of detecting low frequency modulation on said subscriber loop, to detect whether or not said telephone of said predefined type is off-hook.

3. A method as claimed in claim 1 further including the step of monitoring voltage on said subscriber loop to detect signal transitions indicative of an extension-in-use.

4. A method as claimed in claim 3 further including the step of determining whether or not a signal transition indicative of an extension-in-use occurs within a predefined window of time.

5. A method as claimed in claim 4 further including the step of determining whether or not a signal transition indicative of an extension-in-use occurs within first or second predefined windows of time.

6. A method as claimed in claim 5 further including the step of transmitting said first acknowledgement signal if said signal transition indicative of an extension-in-use occurs within said first window of time and transmitting said second acknowledgement signal if said signal transition indicative of an extension-in-use occurs within said second window of time.

7. A method as claimed in claim 5 further including the step of detecting a Caller Alert Signal (CAS) on said subscriber loop and starting a timer in response to detection of said CAS signal.

8. A method as claimed in claim 7 further including the step of defining a pre-acknowledgment tone signal (pre-ack) delay period as a predefined period of time measured from detection of said CAS signal, said first and second windows of time falling within said pre-ack delay period.

9. A method as claimed in claim 8 further including the step of determining whether or not a signal transition indicative of an extension-in-use occurs within a first or second half of said pre-ack delay period.

10. A method as claimed in claim 9 further including the step of transmitting said first acknowledgement signal if said signal transition indicative of an extension-in-use occurs within said first half of said pre-ack delay period and transmitting said second acknowledgement signal if said signal transition indicative of an extension-in-use occurs within said second half of said pre-ack delay period.

11. A method as claimed in claim 8 further including the step of determining whether or not an extension is in use for a period of time less than or equal to said pre-ack delay period from receipt of said CAS signal and if so, setting an ADSI detect flag active according to whether or not the time elapsed since said CAS signal was detected is greater than said pre-ack delay period.

12. A method as claimed in claim 11 further including the step of disabling the transmission of said acknowledgement signal when said ADSI detect flag is set active.

13. A method as claimed in claim 8 further including the step of setting an ADSI detect flag active according to whether or not the time elapsed since said CAS signal was detected is greater than one-half of said pre-ack delay period.

14. A method as claimed in claim 13 further including the step of transmitting said acknowledgement signal after said pre-ack delay period.

15. A method as claimed in claim 13 further including the step of disabling the transmission of said acknowledgement signal when an ADSI detect flag is set active.

16. A method as claimed in claim 8 further including the step of placing said subscriber loop in an on-hook state for a for a time period equal to one-half of a pre-ack delay time period from receipt of said CAS signal.

17. An method as claimed in claim 16 further including the step of muting a receive path until FSK data is received.

18. A method as claimed in claim 16 further including the step of waiting a period of time equal to the sum of one-half of said pre-ack delay period and an ack length period from receipt of said CAS signal prior to placing said subscriber loop in an off hook state.

19. A method as claimed in claim 1 further including the step of disabling the transmission of said acknowledgment signal, and receiving Frequency Shift Keyed (FSK) data from said subscriber loop when an Analog Display Services Interface (ADSI) detect flag is set active.

20. A method as claimed in claim 1 wherein the step of transmitting said acknowledgment signal includes transmitting a Dual Tone Multi-Frequency (DTMF) A after a pre-ack delay period from receipt of said CAS signal.

21. A method as claimed in claim 1 wherein the step of transmitting said acknowledgement signal includes transmitting a DTMF D after a pre-ack delay period from receipt of said CAS signal.

22. An apparatus for signalling a telephone switch to indicate the presence of a telephone of a predefined type on a subscriber loop, the apparatus comprising:
a) a sensor for sensing said subscriber loop to detect whether or not a telephone of a predefined type is connected to said subscriber loop;

b) a transmitter for transmitting to said telephone switch a first acknowledgement signal if said telephone of said predefined type is connected to said subscriber loop and off-hook and transmitting to said telephone switch a second acknowledgement signal if said telephone of said predefined type is not off-hook.

23. An apparatus as claimed in claim 22 wherein said sensor is operable to sense low frequency modulation on said subscriber loop, to detect whether or not said telephone of said predefined type is off-hook.

24. An apparatus as claimed in claim 22 further including an analog to digital converter for, monitoring voltage on said subscriber loop to detect signal transitions indicative of an extension-in-use.

25. An apparatus as claimed in claim 24 further including a processor for determining whether or not a signal transition indicative of an extension-in-use occurs within a predefined window of time.

26. An apparatus as claimed in claim 25 further including a processor for determining whether or not a signal transition indicative of an extension-in-use occurs within first or second predefined windows of time.

27. An apparatus as claimed in claim 26 wherein said transmitter is operable to transmit said first acknowledgement signal if said signal transition indicative of an extension-in-use occurs within said first window of time and transmit said second acknowledgement signal if said signal transition indicative of an extension-in-use occurs within said second window of time.

28. An apparatus as claimed in claim 26 further including a CAS signal detector for detecting a CAS signal on said subscriber loop and a timer started in response to detection of said CAS signal.

29. An apparatus as claimed in claim 28 further including a microprocessor for defining a pre-ack delay period as a predefined period of time measured from detection of said CAS signal, said first and second windows of time falling within said pre-ack delay period.

30. An apparatus as claimed in claim 29 wherein said microprocessor is programmed to determine whether or not a signal transition indicative of an extension-in-use occurs within a first or second half of said pre-ack delay period.

31. An apparatus as claimed in claim 30 wherein said microprocessor is operable to direct said transmitter to transmit said first acknowledgement signal if said signal transition indicative of an extension-in-use occurs within said first half of said pre-ack delay period and to transmit said second acknowledgement signal if said signal transition indicative of an extension-in-use occurs within said second half of said pre-ack delay period.

32. An apparatus as claimed in claim 29 further including a processor for determining whether or not an extension is in use for a period of time less than or equal to said pre-ack delay period from receipt of said CAS signal.

33. An apparatus as claimed in claim 32 wherein said microprocessor is programmed to set an ADSI detect flag active when the time elapsed since said CAS signal was detected is greater than said pre-ack delay period.

34. An apparatus as claimed in claim 32 wherein said microprocessor is programmed to disable the transmission of said acknowledgement signal when said ADSI detect flag is set active.

35. An apparatus as claimed in claim 29 wherein said microprocessor is programmed to set an ADSI detect flag active according to whether or not the time elapsed since said CAS signal was detected is greater than one-half of said pre-ack delay period.

36. An apparatus as claimed in claim 35 wherein said microprocessor is programmed to transmit said acknowledgement signal after said pre-ack delay period.

37. An apparatus as claimed in claim 35 further including an ADSI detect flag register for storing an ADSI detect flag and wherein said microprocessor is programmed to disable the transmission of said acknowledgement signal when said ADSI detect flag is set active.

38. An apparatus as claimed in claim 29 wherein said microprocessor is programmed to place said subscriber loop in an on-hook state for a for a time period equal to one-half of a pre-ack delay time period from receipt of said CAS signal.

39. An method as claimed in claim 38 wherein said microprocessor is programmed to mute a receive path until FSK data is received.

40. An apparatus as claimed in claim 38 wherein said microprocessor is programmed to wait a period of time equal to the sum of one-half of said pre-ack delay period and an ack length period from receipt of said CAS signal prior to placing said subscriber loop in an off hook state.

41. An apparatus as claimed in claim 22 further including an ADSI detect flag register for storing an ADSI detect flag, and a microprocessor operable to control said transmitter, for disabling the transmission of said acknowledgement signal, and for receiving FSK data from said subscriber loop when said ADSI detect flag is set active.

42. An apparatus as claimed in claim 22 wherein said microprocessor is programmed to direct said transmitter to transmit a DTMF A after a pre-ack delay period from receipt of said CAS signal.

43. An apparatus as claimed in claim 22 wherein said microprocessor is programmed to direct said transmitter to transmit a DTMF D after a pre-ack delay period from receipt of said CAS signal.

* * * * *